US011046415B1

(12) United States Patent
Pankonien et al.

(10) Patent No.: US 11,046,415 B1
(45) Date of Patent: Jun. 29, 2021

(54) MULTI-MATERIAL PRINTED CONTROL SURFACE

(71) Applicant: Government of the United States, as represented by the Secretary of the Air Force, Wright-Patterson AFB, OH (US)

(72) Inventors: Alexander Pankonien, Fairborn, OH (US); Nitin Bhagat, Fairborn, OH (US); Ryan Durscher, Loveland, OH (US)

(73) Assignee: United States of Americas as represented by the Secretary of the Air Force, Wright-Patterson AFB, OH (US)

( * ) Notice: Subject to any disclaimer, the term of this patent is extended or adjusted under 35 U.S.C. 154(b) by 158 days.

(21) Appl. No.: 16/403,726

(22) Filed: May 6, 2019

Related U.S. Application Data

(60) Provisional application No. 62/687,408, filed on Jun. 20, 2018.

(51) Int. Cl.
*B64C 3/24* (2006.01)
*B33Y 80/00* (2015.01)
(Continued)

(52) U.S. Cl.
CPC ................ *B64C 3/24* (2013.01); *B33Y 80/00* (2014.12); *B64F 5/10* (2017.01); *B33Y 10/00* (2014.12)

(58) Field of Classification Search
None
See application file for complete search history.

(56) References Cited

U.S. PATENT DOCUMENTS

| 3,670,995 A * | 6/1972 | Swearingen | B64C 17/00 244/80 |
| 3,920,203 A * | 11/1975 | Moorehead | F02K 1/70 244/207 |

(Continued)

FOREIGN PATENT DOCUMENTS

| EP | 2397403 A2 * | 12/2011 | ............... B64C 9/00 |
| WO | 2017152142 | 9/2017 | |

OTHER PUBLICATIONS

Onur Bilgen et al., "Morphing Wing Micro-Air-Vehicles via Macro-Fiber Composite Actuators", American Institute of Aeronautics and Astronautics, Structures, Structural Dynamic and Materials Conferences, AIAA 2007-1785, pp. 1-16, Apr. 2007. (Year: 2007).*

(Continued)

*Primary Examiner* — Michael Lebentritt
(74) *Attorney, Agent, or Firm* — AFMCLO/JAZ; Matthew D. Fair

(57) ABSTRACT

Additive and subtractive manufacturing (e.g. 3D Printing) is used to form aeroelastic airfoils with control surface region(s) having conventional rib/spar structural topologies and a continuous skin (e.g smooth surface) formed over the entire outer surface of the airfoil. The control surface is moved with internal actuators resulting in a "morphing" airfoil as the skin stretches to follow the moving structure of the control surface region. The airfoil can include a plurality of different material moduli and geometric featuring to balance the appropriate control of stiffness with topological requirements.

21 Claims, 5 Drawing Sheets

(51) Int. Cl.
  *B64F 5/10*   (2017.01)
  *B33Y 10/00*  (2015.01)

(56)          References Cited

U.S. PATENT DOCUMENTS

| | | | | |
|---|---|---|---|---|
| 4,813,631 | A * | 3/1989 | Gratzer | B64C 9/146 |
| | | | | 244/209 |
| 5,181,678 | A * | 1/1993 | Widnall | B64C 3/48 |
| | | | | 244/219 |
| 5,222,699 | A * | 6/1993 | Albach | B64C 3/48 |
| | | | | 244/213 |
| 5,518,210 | A * | 5/1996 | Friberg | B64C 3/50 |
| | | | | 244/215 |
| 6,220,550 | B1 * | 4/2001 | McKillip, Jr. | B64C 27/001 |
| | | | | 244/215 |
| 7,598,651 | B2 * | 10/2009 | Kornbluh | H02N 1/00 |
| | | | | 310/309 |
| 8,409,691 | B1 * | 4/2013 | Henry | B32B 5/028 |
| | | | | 428/174 |
| 9,211,690 | B1 * | 12/2015 | McKnight | B32B 3/14 |
| 9,835,112 | B2 | 12/2017 | Calder | |
| 9,856,012 | B2 * | 1/2018 | Xi | B64C 3/52 |
| 9,932,481 | B2 * | 4/2018 | Song | F15D 1/004 |
| 2007/0120011 | A1 * | 5/2007 | Schultz | B64C 23/06 |
| | | | | 244/99.2 |
| 2008/0035788 | A1 * | 2/2008 | Kothera | B64C 9/00 |
| | | | | 244/99.8 |
| 2008/0035798 | A1 * | 2/2008 | Kothera | B64C 3/54 |
| | | | | 244/212 |
| 2009/0212164 | A1 * | 8/2009 | Osborne | B64C 23/005 |
| | | | | 244/205 |
| 2010/0133387 | A1 * | 6/2010 | Wood | B64C 3/48 |
| | | | | 244/219 |
| 2010/0259046 | A1 * | 10/2010 | Kota | F03D 1/0641 |
| | | | | 290/44 |
| 2011/0017876 | A1 * | 1/2011 | Manley | B64C 9/16 |
| | | | | 244/219 |
| 2011/0038727 | A1 * | 2/2011 | Vos | B64C 3/50 |
| | | | | 416/1 |
| 2011/0114791 | A1 * | 5/2011 | Henry | B29C 70/088 |
| | | | | 244/123.6 |
| 2011/0142628 | A1 * | 6/2011 | Xiong | F03D 7/022 |
| | | | | 416/23 |
| 2012/0148794 | A1 * | 6/2012 | Keller | F01D 5/288 |
| | | | | 428/117 |
| 2013/0064666 | A1 * | 3/2013 | Thomas | B64C 27/72 |
| | | | | 416/158 |
| 2013/0241102 | A1 | 9/2013 | Rodgers | |
| 2014/0001761 | A1 * | 1/2014 | Weiland | F03B 17/06 |
| | | | | 290/54 |
| 2015/0251747 | A1 * | 9/2015 | Roe | B64C 3/54 |
| | | | | 244/219 |
| 2015/0352784 | A1 | 12/2015 | Lechmann | |
| 2016/0159465 | A1 * | 6/2016 | Koppelman | B64C 21/06 |
| | | | | 244/209 |
| 2016/0167764 | A1 * | 6/2016 | Grip | B64C 3/22 |
| | | | | 244/123.4 |
| 2017/0028619 | A1 | 2/2017 | Evans | |
| 2017/0028620 | A1 | 2/2017 | Evans | |
| 2017/0100886 | A1 | 4/2017 | Durant | |
| 2017/0197363 | A1 | 7/2017 | Frantzdale | |
| 2017/0305525 | A1 * | 10/2017 | Xi | B64C 3/385 |
| 2017/0314588 | A1 | 11/2017 | Kota | |
| 2017/0328213 | A1 * | 11/2017 | Bunker | F04D 29/324 |
| 2018/0029296 | A1 | 2/2018 | Van Esbroeck | |
| 2018/0257759 | A1 * | 9/2018 | Etling | B64C 3/52 |
| 2019/0032491 | A1 * | 1/2019 | Nissen | B23K 26/342 |
| 2019/0118943 | A1 * | 4/2019 | Machin | B64C 39/024 |
| 2019/0202543 | A1 * | 7/2019 | Gatto | F03D 1/0633 |
| 2020/0191011 | A1 * | 6/2020 | Chaudhry | F01D 9/02 |

OTHER PUBLICATIONS

Vos et al., "Mechanism for Warp-Controlled Twist of a Morphing Wing", J. of Aircraft 47 (2010), pp. 450-457. (Year: 2010).*
Shaw et al., "Optimisation of Composite Corrugated Skins for Buckling in Morphing Aircraft", Composite Structures 119, (2015), pp. 227-237. (Year: 2015).*
Woods, Morphing elastic lofted transition for active camber control surfaces, Aerospace science and technology 55 (2016) pp. 439-448.
Pankonian, From model to manufacture: Additive aeroelastic morphing testbed, IFSD 2017, pp. 1-15.

* cited by examiner

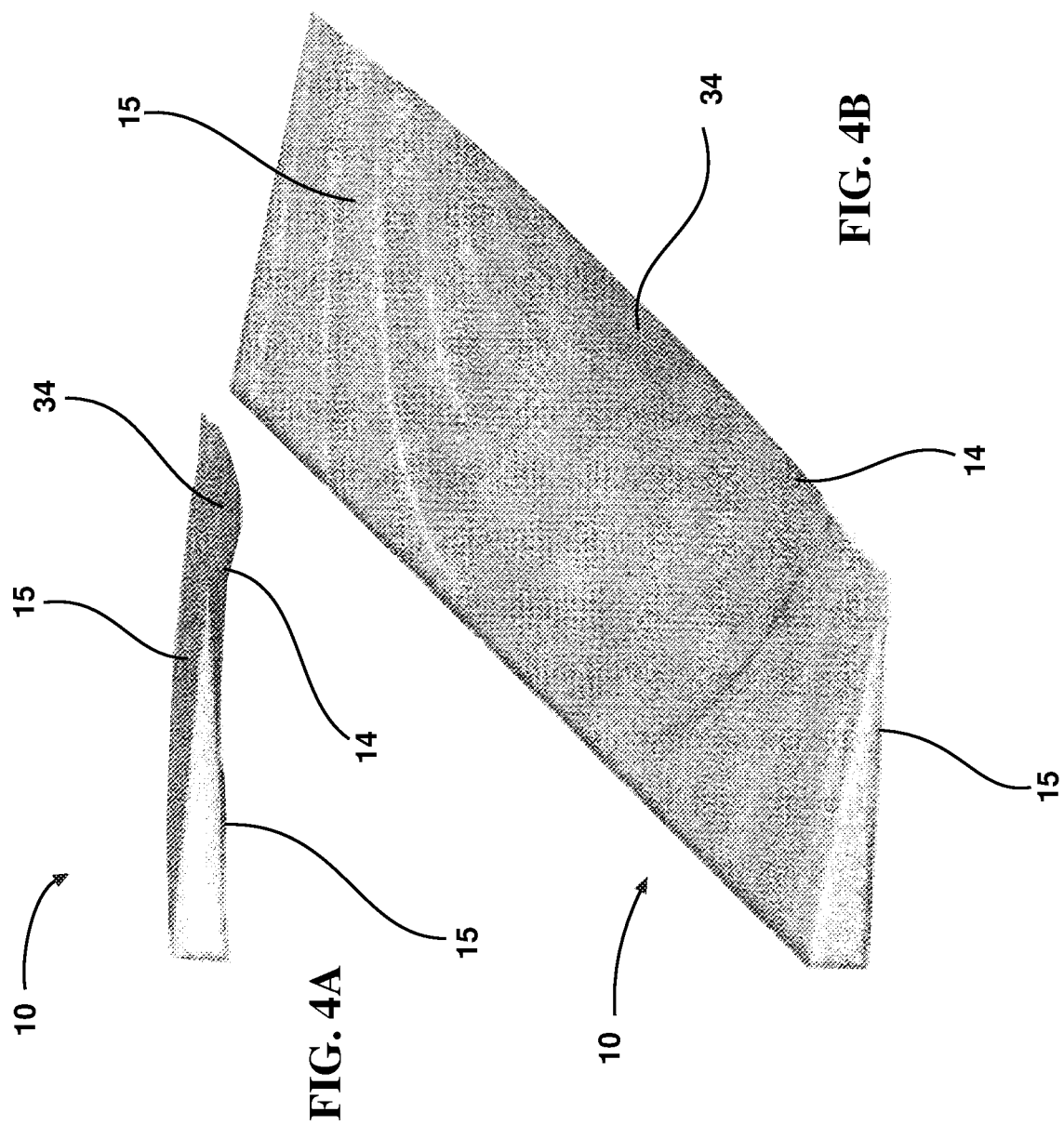

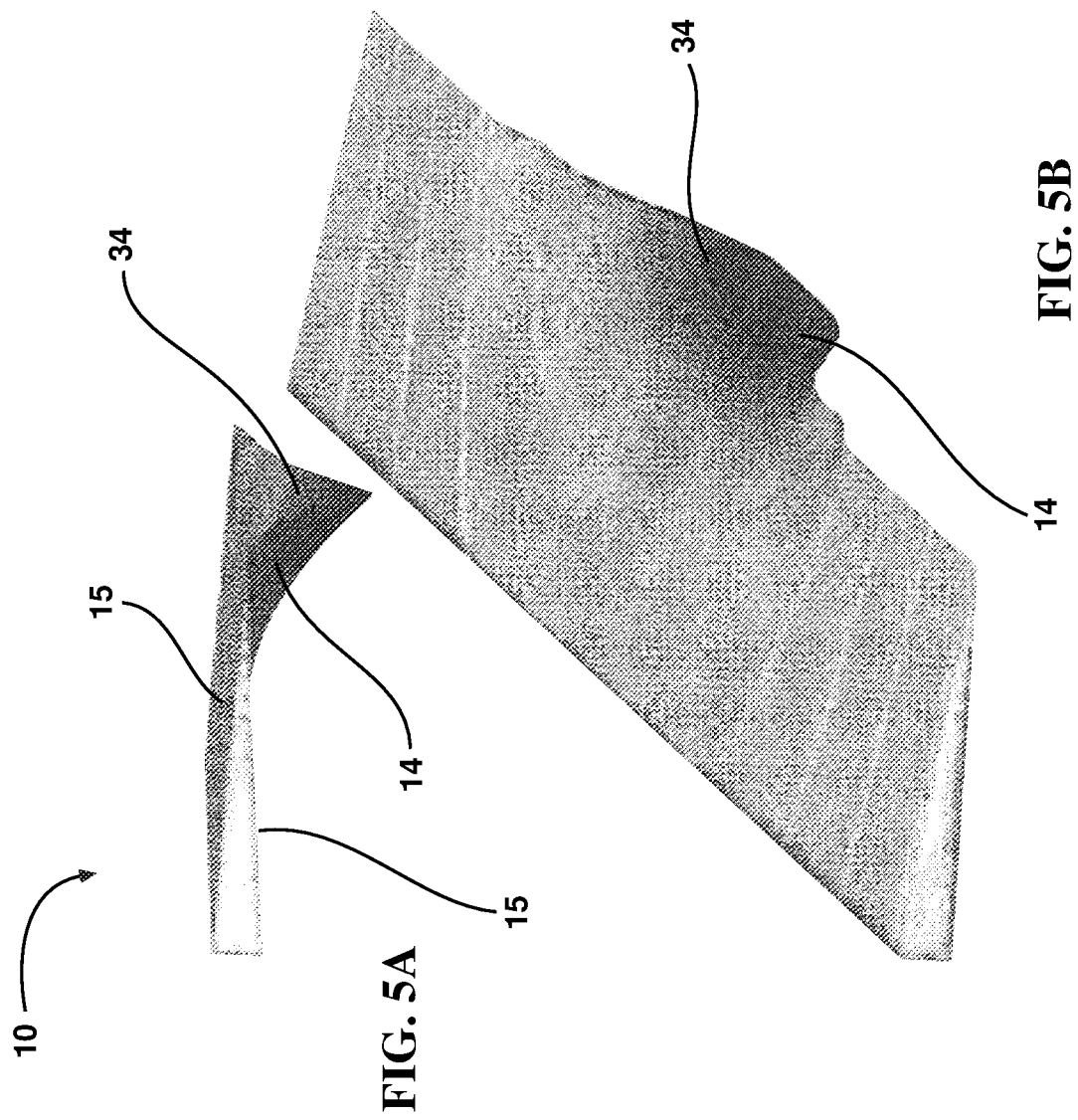

MULTI-MATERIAL PRINTED CONTROL SURFACE

CROSS-REFERENCE TO RELATED APPLICATIONS

This application claims the benefit of U.S. Provisional Application No. 62/687,408 filed on Jun. 20, 2018 and the contents of which are incorporated by reference herein.

RIGHTS OF THE GOVERNMENT

The invention described herein may be manufactured and used by or for the Government of the United States for all governmental purposes without the payment of any royalty.

TECHNICAL FIELD

The present disclosure generally relates to an airfoil with fluid dynamic control surfaces fabricated through additive manufacturing techniques (e.g. 3D printing) and more particularly, but not exclusively to printing an airfoil with a plurality of internal structural components having a continuous flexible skin formed thereon.

BACKGROUND

Airfoils formed as an aircraft wing, a helicopter rotor blade, a wind turbine, automotive wing or other similar structures can include movable control surfaces operable for varying fluid force loading (i.e. lift and drag) generated by a fluid moving across the surfaces thereof. Airfoils can be positioned on a moving vehicle or on a fixed apparatus positioned in a moving fluid. In prior art airfoils, a discontinuity is formed in the outer surface or "skin" between the fixed portions and the movable portions (commonly referred to as a control surface). These discontinuities in the skin causes decrease in lift and increase in aerodynamic drag losses as the fluid passes across the airfoil. As such, existing airfoils with control surfaces have various shortcomings relative to certain applications. Accordingly, there remains a need for further contributions in this area of technology.

SUMMARY

One embodiment of the present disclosure is an airfoil with a control surface manufactured via free form fabrication (e.g. 3D printing) with a plurality of different materials. The airfoil is integrally formed with internal load bearing structure such as ribs or spars with a continuous flexible skin formed there around. Other embodiments include apparatuses, systems, devices, hardware, methods, and combinations for forming a unique fluid control surface having a continuous flexible skin formed there around as disclosed herein. Further embodiments, forms, features, aspects, benefits, and advantages of the present application shall become apparent from the description and figures provided herewith.

BRIEF DESCRIPTION OF THE FIGURES

FIG. 4A is a side perspective view of a control surface with actuators causing a relative small deformed surface;

FIG. 4B is a top perspective view of the deformed control surface of FIG. 4A;

FIG. 5A is a side perspective view of a control surface with actuators causing another relatively larger deformed surface; and FIG. 5B is a top perspective view of the control surface of FIG. 5A.

DETAILED DESCRIPTION OF THE ILLUSTRATIVE EMBODIMENTS

Figure 1:
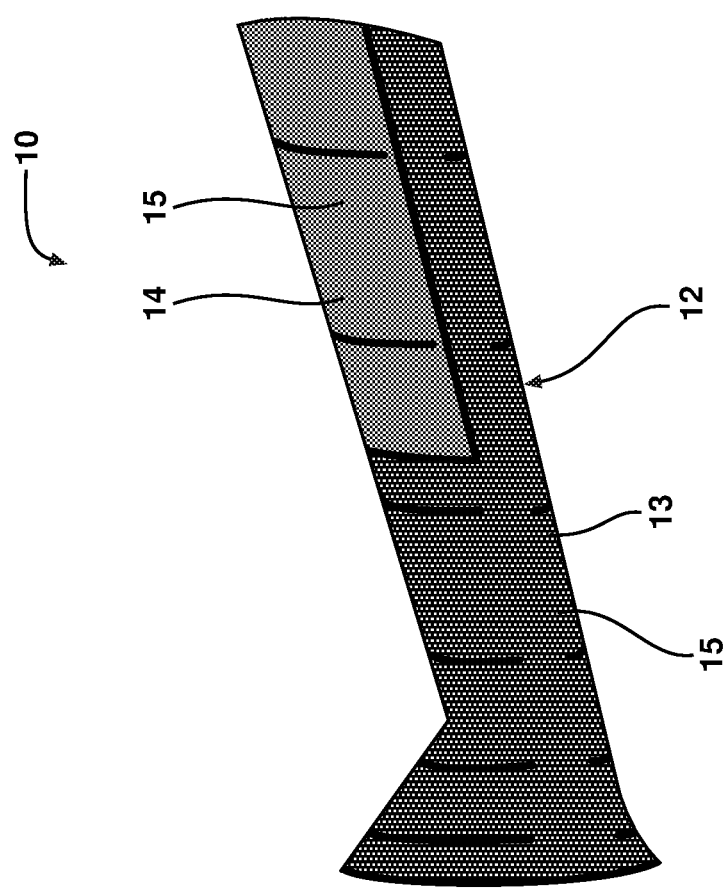
FIG. 1 is a perspective view of an exemplary wing structure with a control surface formed as an integral component via free form fabrication.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The term "fluid" as used herein can include any gas or liquid medium that an airfoil or aerodynamic control surface can operate within. It should be understood that air and water are typical of the fluid environments in which an airfoil will operate, but the present invention should not be limited as such. It should also be understood that terms such as fluid, gas, liquid, aerodynamic, fluid dynamic etc., can be used interchangeably for purposes of this patent application.

The present disclosure provides a novel way to design and construct an aerodynamic control surface. The disclosed method provides for a continuous external surface or "skin" along the entire airfoil for an aircraft wing or the like. The "continuous skin" is more aerodynamically efficient than conventional control surfaces. While the exemplary embodiments depicted herein are directed to an aircraft wing, it should be understood that the invention is not limited as such. On the contrary, any mechanical component that includes flexible and/or deformable outer skin that can be formed through free form fabrication methods are contemplated by this application.

The methods and systems disclosed herein enable fabrication of a relatively smooth control surface in a wing structure which minimizes aerodynamic losses associated with traditional control surfaces (i.e. flaps, ailerons, elevators, rudders, etc.), including spanwise losses (flap vortices) and chordwise losses (aerodynamic turbulent transition and flow separation). The term "relatively smooth surface" can be defined herein as a surface that is continuous or substantially continuous without a discontinuity along the surface profile.

The control surface and fixed portion of the airfoil is connected together with a "continuous" skin that is formed by printing the skin contemporaneously with the internal structural components with a 3D printer. Applications for such a control surface includes low-cost wind tunnel testing and aeroelastic model verification as well as for full scale production flight vehicles, land vehicles, and water vessels. The printed components can include different material systems such as, by way of example and not limitation, plastics, elastomers, super-elastic nickel-titanium and other metals and alloys capable of recoverable strains. The printed control surface can be used to replace conventional flight control surfaces on legacy vehicles as well as being incorporated into newly designed vehicles.

The topological concept for a control surface can be constructed with a very limited set of design variables, which permits multi-disciplinary design optimization of a wing. Because the control surface can be printed on a single printer machine, the fabrication complexity is minimized relative to prior art fabrication processes. The continuous aerodynamic surface eliminates flap vortices (an aerodynamic loss) and can minimize chord wise aerodynamic losses associated with traditional discrete flaps or other moveable control surfaces.

The topology can be described by a vector field along which the preferred loading path would propagate. This load path is physically realized by propagating a line path (via line integration) with a set of seed points along the outer edge of the control surface. With these locations defined, curving I-beams (denoted as semi-rigid spines), follow these line paths. The geometry between the spines along the upper and lower surfaces can be defined by a compliant material. Materials can be selected from any of a plurality of different compositions including plastic and elastomer. The technique can be generalized to an arbitrary stiffness vector field or alternative multi-material systems. Once this geometry is described computationally, the wing and control surface can be formed by additive manufacturing processing, e.g. 3D printing. Actuators can then be operably coupled to the active region so as to provide suitable actuation means. For example Macro-Fiber Composite (MFC) patches including piezoelectric means that move when voltage is applied. When bonded to a comparatively stiff substrate, such as a stainless steel shim, the MFC can be used to achieve bending actuation to smoothly affect the shape. It should be understood that the actuation means is not limited to MFC, but on the contrary any actuation means suitable for the types of applications disclosed herein is contemplated.

The method for forming the control surface and the fixed portion of the airfoil includes using computer programs and data files to define the surface profile as one skilled in the art would understand. The fixed portion and control surface can be integrally printed contemporaneously with a 3D printer that is capable of processing elastomers, rigid plastics and/or other materials. After the control surface is formed, any support material that is not part of the final design may be removed via conventional means such as with a power washer or dipping in chemical solution vat, etc. In some forms the control surface may be assembled from two or more fabricated components made from an additive and/or subtractive process and subsequently fastened together.

In the exemplary embodiment, a trailing edge control surface is disclosed herein, however the teachings of the present application is not limited to the disclosed embodiment as the systems and methods herein may also be used to create a leading edge control surface as well as other types of control surfaces as would be known to those skilled in the art. The control surface is made by using a multi-material 3D-printer and is integrated into an aeroelastic model as a control surface to affect the flow of fluid about a wing. Alternative configurations can include material systems (such as shape memory alloys including Nickel Titanium or the like) that include variation in effective material stiffness required to achieve a desired performance for different scale vehicles with the same topological description and analysis tools. A vector field can be used to define the spines and the origin of the spine propagation points, however alternative techniques for generating a stiffness path may also be used such as pre-defined point clouds or specified curves.

In one embodiment, multi-material 3D-printing can be used for creating a low-cost, highly-tailorable wind tunnel flutter model with an internal topology representative of a typical flight vehicle. The internal rib/spar/skin topology of the wing model is derived from methodologies inherent to conventional fabrication processes, however the additive fabrication method for this model is not constrained by the conventional requirements of independently-fabricated, planar ribs and spar members of uniform material properties. Absent these fabrication constraints, the feasible topologies can also change, allowing for greater stiffness control and non-conventional designs to achieve alternative performance objectives. The topology can be redefined by a set of non-planar "spines" propagating from a perimeter seed point taking an arcuate curved path. These spines act like both rib and spar, steering the stiffness appropriate to a more-optimal load path.

In some forms, using a Spine Control Surface (SCS) method reduces geometric complexity by permitting stiffer portions (spines) to be designed into locations that carry higher loads. The relative "stiff" spines are substantially aligned with the desired load paths and an elastomer can be printed between the spines in higher strain regions. Rather than designing the skin after-the-fact in the design, the SCS incorporates the skin as a component that links and holds the spines together. In this manner, it is also possible to incorporate "pre-strain" in the printed design to pre-load the elastomer.

In one form, the bending actuation for the control mechanism can be implemented by using Macro-Fiber Composite unimorphs ("MFC") that are bonded to the inside of the upper and lower skins. It should be understood that the terms "upper and lower" are relative and not absolute therefore the terms can be understood as opposing sides regardless of the orientation. It should also be understood that other actuation means can be used with the present invention. A representative example of parameters that can be chosen is found in the description of the topological parameters in Table 1 below. In this example the bounding box for the design is derived from the location of the rear spar and the chord length of the wind tunnel flutter model, which then also dictates the size of the MFC actuator.

TABLE 1

Parametric description of Spined Control Surface

| Parameter | Description | "Baseline" value |
|---|---|---|
| $b_t$ | Control Surface Span | 38.1 cm |
| $c_t$ | Control Surface Chord | 8.3 cm |
| $n_{act}$ | Number of actuators on each surface | 2 |
| $l_t$ | Transition Span (derived with $n_{act}$) | 14.6 cm |
| $y_{45/lt}$ | Nondimensional spine turning distance | 0.5 |
| $t_{spine1}$ | Spine width | 0.608 cm |
| $t_{spine2}$ | Flange width | 4.04 cm |
| $t_{skin}$ | Skin Thickness | 0.158 cm |
| $n_{spines}$ | Number of spines | 6 |

As can be seen from the topological description parameters in Table 1, if the bounding box for the control surface is predefined, as well as the discrete actuator size (in this case dictated by MFC patches), there are only six design parameters for design space exploration of a complex topology.

By way of example, an Objet Connex 500 can be selected as the 3D-printer to fabricate a SCS article. In some forms, the control surface can be fabricated as one integrated component, however when the geometry of the control surface includes enclosed voids that preclude removal, electronic components, or other items that are required to be positioned internal to the airfoil/control surface, then the airfoil/control surface can be divided along a mid-plane to create upper and lower halves. In other forms, the upper and lower halves can be created separately via free form fabrication methods. In either case, the upper and lower halves can then be joined to make the final airfoil/control surface. The method for joining or re-joining the upper and lower halves of the SCS can include mechanical fasteners, welding, brazing, adhesive, or other known means.

Referring now to FIG. 1, a printed structure 10 is illustrative as an exemplary embodiment of the present disclosure. In this exemplary form, the printed structure 10 is an airfoil 12 for an aircraft wing. The printed structure 10 defines a fixed airfoil portion 13 and a movable portion 14 sometimes called a control surface. The entire structure 10 is covered in a continuous outer covering or skin 15. It should be noted that there appears to be a discontinuity in the skin 15 between the control surface 14 and the fixed airfoil portion 12, however the demarcation in the drawing is merely meant to be an aid in understanding the boundary between the movable portion 14 and the fixed portion 13 of the airfoil 12. As explained above the printed structure 10 can be printed on a single 3D printer with the capability of printing different materials into the same structure.

Figure 2:
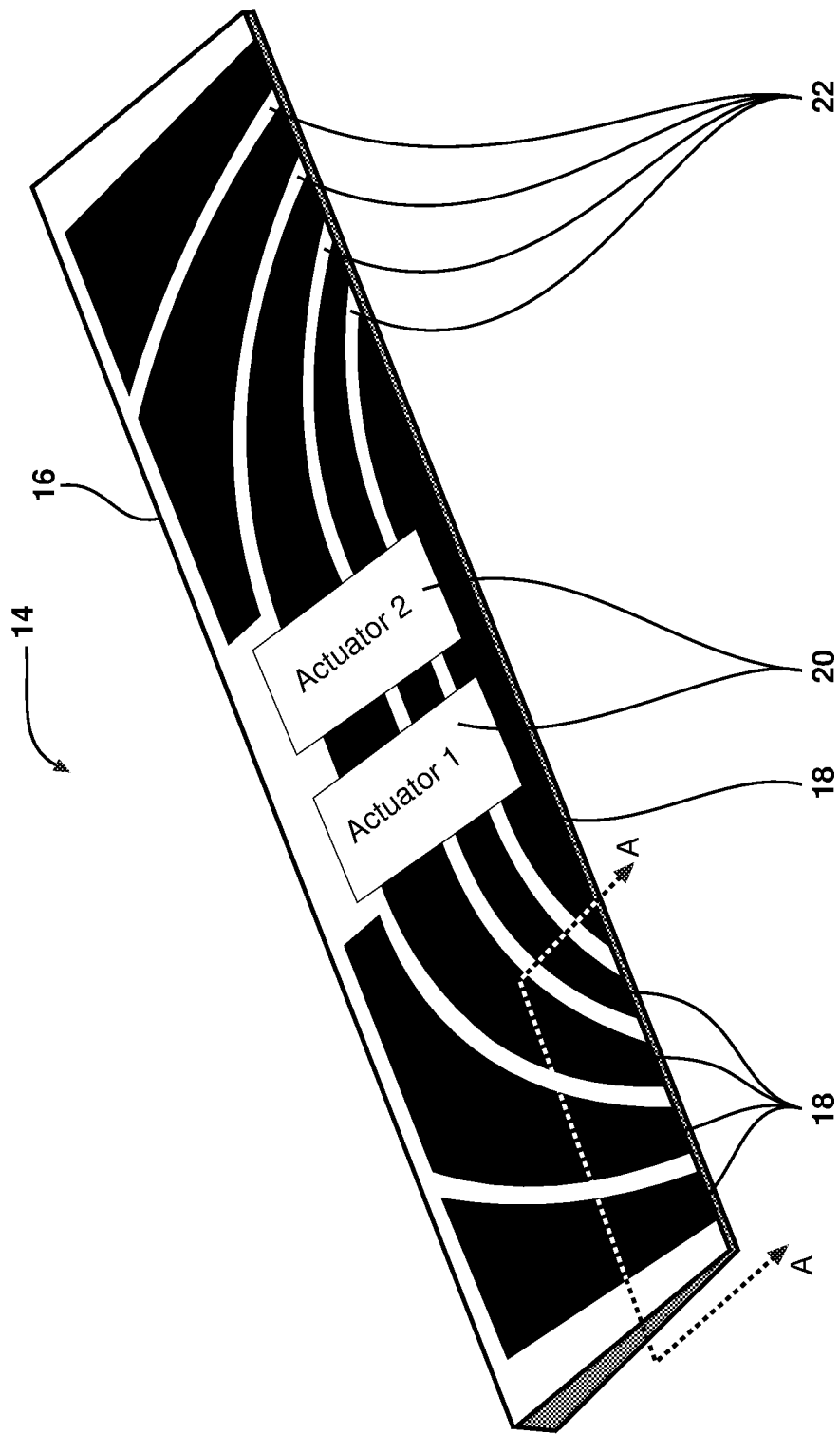
FIG. 2 is a section view of an exemplary parametric control surface according to one exemplary embodiment of the present disclosure.
Figure 3:
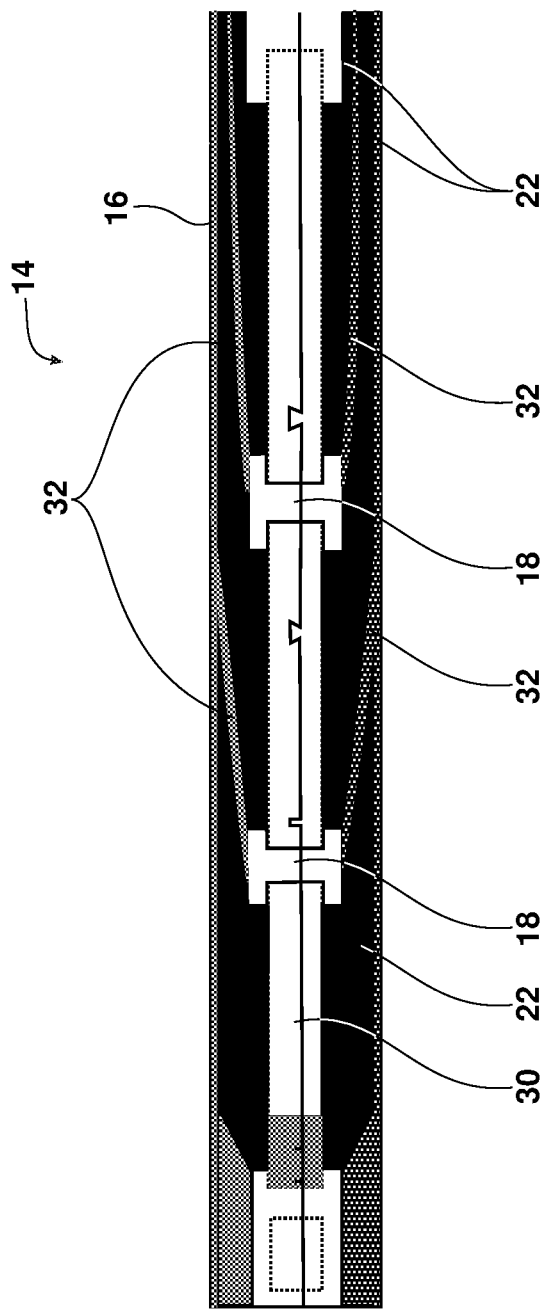
FIG. 3 is a cross sectional view taken along line A-A of the control surface of FIG. 2.

Referring to FIGS. 2 and 3, an internal portion 16 of the control surface 14 is depicted in schematic form. The internal portion 16 can include a plurality of relative stiff spines 18 that are operably connected to one or more actuators 20. The actuators 20 are configured to move the spines into desired locations so as to cause the control surface 14 to change the lift/drag profile of the airfoil 12 (see FIG. 1). A relative flexible and/or stretchable material 22 can be printed between the spines 18. The relative flexible material 22 permits the spines to move relative to one another and cause the control surface region to change shape or "morph." The same material 22 or a different material may be fabricated above and below the spines 18 as viewed in FIG. 2. Referring more particularly to FIG. 3, a side cross-sectional view of the internal portion 16 illustrates a central support structure 30 connected to a plurality of spines 18. One or more actuator elements 32 are connected between the actuators 20 (not shown) and each of the spines 18 to cause movement of the spines and thus changing shape of the control surface portion of the airfoil 14. Although not shown, the printed airfoil 10 can include one or more electronic sensors operably coupled with a control system to facilitate operation of the morphing control surface 14. By way of example and not limitation the electronic sensors can include at least one of a position sensor, pressure sensor, a temperature sensor, a strain sensor, an accelerometer, and a load sensor to improve the state-estimation or sensing of the application without necessarily penalizing its inherent ability to achieve desired aerodynamically-conducive shapes.

Referring now to FIGS. 4A and 4B a side perspective view and a top perspective view of a airfoil 10 with a control surface 14 is illustrated with downward deflection such that a morphing region 34 has a continuous skin 15 connected to and around the fixed portion of the airfoil 10. FIGS. 5A and 5B illustrate similar views to that of FIGS. 4A and 4B, however the morphing region 34 has a relative larger downward deflection to illustrate that actuation variability can change the lift and draft forces on the airfoil 10 while the skin 15 stretches to remain substantially uniform without discontinuity across the entire outer surface of the airfoil 10.

In one aspect the present disclosure includes an apparatus comprising: an airfoil having a fixed portion and a movable control surface; an internal structure forming a portion of the airfoil; a surface skin formed as a substantially continuous cover over the internal structure; and wherein the skin includes a relatively flexible and/or stretchable portion formed about the movable control surface.

In refined aspects, the present disclosure incudes wherein the skin and the internal structure are formed as an integral structure by an additive manufacturing process; relatively stiff spines forming a portion of the internal structure; relatively stiff spines positioned within the movable control surface a relatively flexible and/or stretchable material connected to the spines at least one actuator operable for moving the control surface; wherein the actuator is an Macro-Fiber Composite unimorphs (MFC); at least one electronic sensor operably connected thereto; and wherein the electronic sensor is at least one of a position sensor, pressure sensor, a temperature sensor, a strain sensor, an accelerometer, and a load sensor.

In another aspect the present disclosure includes a printed airfoil comprising: an airfoil having a fixed portion and a movable control surface; an internal structure forming a portion of the airfoil; a surface skin formed as a substantially continuous cover over the internal structure; and wherein the skin includes a relatively flexible portion formed about the movable control surface.

In refined aspects, the present disclosure incudes wherein the skin and the internal structure are formed as an integral structure by an additive manufacturing process; The printed airfoil of claim 10, further comprising relatively stiff spines positioned in the fixed portion; relatively stiff spines positioned within the movable control surface; a relatively flexible material connected to the spines; at least one actuator operable for moving the control surface; at least one electronic sensor operably connected thereto; wherein the electronic sensor is at least one of a position sensor, pressure sensor, a temperature sensor, a strain sensor, an accelerometer, and a load sensor.

In another aspect the present disclosure incudes a method comprising: forming internal structure and an outer skin into an airfoil with an additive manufacturing process; wherein the airfoil includes a fixed portion and a movable portion; and wherein the skin is formed substantially continuously about the fixed portion and the movable portion of the airfoil.

In refined aspects, the present disclosure incudes moving the movable portion to a different location to change a lift and a drag force generated by the airfoil; stretching and contracting the skin to follow the movable portion to the different location; and moving includes energizing an electronic actuator to move the movable portion.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:
   an airfoil having a fixed trailing edge portion and a movable aerodynamic control surface;
   an internal structure forming a portion of the airfoil;
   a surface skin formed as a continuous cover over the internal structure;
   wherein the skin includes a relatively flexible and/or stretchable portion formed about the movable control surface; and
   wherein the flexible portion of the skin is formed on both the pressure and suction side surfaces of the airfoil.

2. The apparatus of claim 1, wherein the skin and internal structure are formed as an integral structure by an additive manufacturing process.

3. The apparatus of claim 1, further comprising relatively stiff spines forming a portion of the internal structure.

4. The apparatus of claim 1, further comprising relatively stiff spines positioned within the movable control surface.

5. The apparatus of claim 4, further comprising a relatively flexible and/or stretchable material connected to the spines.

6. The apparatus of claim 1, further comprising at least one actuator operable for moving the control surface.

7. The apparatus of claim 6, wherein the actuator is an Macro-Fiber Composite unimorphs (MFC).

8. The apparatus of claim 1, further comprising at least one electronic sensor operably connected thereto.

9. The apparatus system of claim 8, wherein the electronic sensor is at least one of a position sensor, pressure sensor, a temperature sensor, a strain sensor, an accelerometer, and a load sensor.

10. A printed airfoil comprising:
    an airfoil having a fixed trailing edge portion and a movable control surface;
    an internal structure forming a portion of the airfoil;
    a surface skin formed as a continuous cover over the fixed portion and the movable control surface; and
    wherein the skin includes a relatively flexible portion formed about the movable control surface on both the pressure side and suction side surfaces.

11. The printed airfoil of claim 10, wherein the skin and the internal structure are formed as an integral structure by an additive manufacturing process.

12. The printed airfoil of claim 10, further comprising relatively stiff spines positioned in the fixed portion.

13. The printed airfoil of claim 10, further comprising relatively stiff spines positioned within the movable control surface.

14. The printed airfoil of claim 13, further comprising a relatively flexible material connected to the spines.

15. The printed airfoil of claim 10, further comprising at least one actuator operable for moving the control surface.

16. The printed airfoil of claim 10, further comprising at least one electronic sensor operably connected thereto.

17. The printed airfoil of claim 10, wherein the electronic sensor is at least one of a position sensor, pressure sensor, a temperature sensor, a strain sensor, an accelerometer, and a load sensor.

18. A method comprising:
    forming internal structure and an outer skin into an airfoil with an additive manufacturing process,
    wherein the airfoil includes a fixed trailing edge portion and a movable portion;
    wherein the skin is formed continuously over upper and lower surfaces of the fixed portion and the movable portion of the airfoil; and
    flexing the skin on both the upper and lower surface of the movable portion to change a lift profile of the airfoil.

19. The method of claim 18, wherein the flexing includes moving the movable portion to a different location to change a lift and a drag force generated by the airfoil.

20. The method of claim 19, wherein the flexing includes stretching and contracting the skin to follow the movable portion to the different location.

21. The method of claim 19 wherein the moving includes energizing an electronic actuator to move the movable portion.

* * * * *